US010759356B2

(12) United States Patent
Lee et al.

(10) Patent No.: US 10,759,356 B2
(45) Date of Patent: Sep. 1, 2020

(54) FASTENING CLIP FOR VEHICLE AND METHOD OF MOUNTING THE SAME

(71) Applicants: Hyundai Motor Company, Seoul (KR); Kia Motors Corporation, Seoul (KR); NIFCO KOREA Inc., Asan, Chungcheongnam-do (KR)

(72) Inventors: Bosung Lee, Daejeon (KR); Seung Hwan Park, Seoul (KR); Bu Yeol Ryu, Gyeonggi-Do (KR); Yoo Sung Doh, Chungcheongnam-do (KR)

(73) Assignees: Hyundai Motor Company, Seoul (KR); Kia Motors Corporation, Seoul (KR); NIFCO KOREA Inc., Asan, Chungcheongnam-do (KR)

( * ) Notice: Subject to any disclaimer, the term of this patent is extended or adjusted under 35 U.S.C. 154(b) by 34 days.

(21) Appl. No.: 16/207,110

(22) Filed: Dec. 1, 2018

(65) Prior Publication Data

US 2019/0176719 A1   Jun. 13, 2019

(30) Foreign Application Priority Data

Dec. 11, 2017  (KR) ........................ 10-2017-0169258

(51) Int. Cl.
| | | |
|---|---|---|
| *B60R 13/00* | (2006.01) | |
| *B60R 13/02* | (2006.01) | |
| *F16B 5/06* | (2006.01) | |
| *F16B 21/02* | (2006.01) | |
| *F16B 21/08* | (2006.01) | |

(52) U.S. Cl.
CPC ...... *B60R 13/0206* (2013.01); *B60R 13/0237* (2013.01); *F16B 5/065* (2013.01); *F16B 21/02* (2013.01); *F16B 21/086* (2013.01)

(58) Field of Classification Search
CPC ........ F16B 5/065; F16B 21/02; F16B 21/086; Y10C 24/4578; B60R 13/0206
USPC ..................... 411/349, 508; 24/289, 292, 297
See application file for complete search history.

(56) References Cited

U.S. PATENT DOCUMENTS

| | | | | |
|---|---|---|---|---|
| 4,506,419 | A * | 3/1985 | Mitomi | .................... F16B 21/02 24/289 |
| 7,207,758 | B2 * | 4/2007 | Leon | ....................... F16B 21/02 411/45 |
| 9,086,086 | B2 * | 7/2015 | Bentrim | .................. F16B 21/20 |
| 9,982,699 | B2 * | 5/2018 | Risdale | ................. F16B 19/002 |
| 2001/0036392 | A1 * | 11/2001 | Reddicliffe | ............. F16B 19/00 411/349 |

* cited by examiner

*Primary Examiner* — Dennis H Pedder
(74) *Attorney, Agent, or Firm* — Mintz Levin Cohn Ferris Glovsky and Popeo, P.C.; Peter F. Corless (57) ABSTRACT

A fastening clip for a vehicle to mount a vehicle structure to a vehicle body panel is provided. The fastening clip includes a main body that is formed integrally with a support portion disposed between the vehicle structure and the vehicle body panel. An upper end of the main body is inserted into at least one first aperture formed in the vehicle structure and a lower end of the main body is inserted into at least one second aperture formed in the vehicle body panel. The fastening clip further includes a holder which is detachably coupled to the main body and fixes the vehicle structure to the main body, thereby ensuring that the vehicle structure is fastened to or separated from the vehicle body panel more easily.

15 Claims, 14 Drawing Sheets

FASTENING CLIP FOR VEHICLE AND METHOD OF MOUNTING THE SAME

CROSS-REFERENCE TO RELATED APPLICATION

This application claims priority to and the benefit of Korean Patent Application No. 10-2017-0169258 filed on Dec. 11, 2017, the entire contents of which are incorporated herein by reference.

BACKGROUND

(a) Field of the Invention

The present invention relates to a fastening clip for a vehicle, and more particularly, to a fastening clip for a vehicle that enables a vehicle structure to be more easily fastened to or separated from a vehicle body panel.

(b) Description of the Related Art

Various types of vehicle structures are mounted on a vehicle body panel. In the related art, the vehicle structure is assembled to the vehicle body panel mainly by bolting. However, in the aforementioned method of mounting the vehicle structure in the related art, an operator is required to manually mount and separate the vehicle structure using a tool, and accordingly, working time and the number of processes are increased and maintenance characteristics are deteriorated.

The above information disclosed in this section is merely for enhancement of understanding of the background of the invention and therefore it may contain information that does not form the prior art that is already known in this country to a person of ordinary skill in the art.

SUMMARY

The present invention provides a fastening clip for a vehicle which enables a vehicle structure to be fastened to or separated from a vehicle body panel without a separate tool, thereby decreasing working time and the number of processes and improving maintenance properties.

An exemplary embodiment of the present invention provides a fastening clip for a vehicle to mount a vehicle structure to a vehicle body panel. The fastening clip may include a main body formed integrally with a support portion disposed between the vehicle structure and the vehicle body panel, and an upper end of the main body may be inserted into at least one first aperture formed in the vehicle structure and a lower end of the main body may be inserted into at least one second aperture formed in the vehicle body panel. The fastening clip may include a holder which is detachably coupled to the main body and fixes the vehicle structure to the main body.

The main body may further include a holder insertion portion formed at an upper side of the support portion and inserted into the holder; and a panel insertion portion formed at a lower side of the support portion and inserted into the second aperture. The holder insertion portion may include at least one push protrusion that protrudes at a center toward the upper side. The holder may include an insertion port into which the push protrusion is inserted. The insertion port may include at least one support protrusion and the push protrusion and the support protrusion may be slidably coupled by a rotation of the holder. An approaching inclined surface may be formed at a lower side of the push protrusion.

The holder insertion portion may further include at least one fitting protrusion which is spaced apart from the push protrusion radially outward and protrudes toward the upper side. The holder may further include a fitting protrusion groove into which the fitting protrusion is inserted, and the holder may be rotatable relative to the holder insertion portion while the fitting protrusion is inserted into the fitting protrusion groove.

The fitting protrusion groove may include an inner circumferential surface which has an arc shape, and an outer circumferential surface which is formed at a predetermined interval from the inner circumferential surface and has an arc shape, the fitting protrusion may be movable along the inner circumferential surface, a fixing protrusion, which engages with the fitting protrusion, may protrude radially outward from one end of the inner circumferential surface, and the fixing protrusion may have a fitting protrusion approaching surface. Further, an obstructing protrusion, which protrudes radially inward, may be formed on the outer circumferential surface of the fitting protrusion groove at a position that corresponds to the fixing protrusion.

Moreover, a handle portion may be formed at an upper side of the holder to enable a user to rotate the holder by holding the handle portion. A tool groove may be formed in the handle portion. The panel insertion portion may further include a hook which is spaced apart from the support portion toward the lower side and protrudes radially outward. The hook may include a fixed end fixed to the panel insertion portion and a free end opposite to the fixed end, and the free end may be rotatable about the fixed end.

The hook may further include a convex portion which protrudes radially outward between the fixed end and the free end. A first inclined surface and a second inclined surface may be formed between the convex portion and the fixed end and between the convex portion and the free end, respectively. The convex portion may be moved radially inward when mounting the fastening clip on the vehicle body panel, and the convex portion may be resiliently restored to an initial position when the fastening clip is mounted.

An insertion guide, which has a diameter that decreases from an upper end toward a lower end, may be formed at the lower end of the panel insertion portion. The insertion guide may include a first guide surface and a second guide surface opposite to the first guide surface. An angle of the first guide surface may be greater than an angle of the second guide surface. The fastening clip may further include a packing which seals a portion between the vehicle body panel and the main body. The packing may be disposed between the support portion and the hook.

Another exemplary embodiment of the present invention provides a method of mounting a vehicle structure to a vehicle body panel using the fastening clip for a vehicle, in which the main body includes a holder insertion portion formed at an upper side of the support portion and inserted into the holder, and a panel insertion portion formed at a lower side of the support portion and inserted into the vehicle body panel. The method may include supporting the vehicle structure on the support portion by inserting the holder insertion portion into the second aperture; coupling the holder and the holder insertion portion; rotating the holder relative to the holder insertion portion; and inserting the panel insertion portion of the fastening clip into the vehicle body panel. In particular, the panel insertion portion may further include a hook which is elastically rotatable about the panel insertion portion. The hook may be moved radially inward when inserting the panel insertion portion into the vehicle body panel and the hook may return to an original position when the fastening clip is mounted.

According to the exemplary embodiment of the present invention, working time and the number of processes may be decreased since the vehicle structure may be fastened to the vehicle body panel without a separate tool, and maintenance properties may be improved since the vehicle structure may be separated without a separate tool to perform a maintenance of the vehicle structure and components.

BRIEF DESCRIPTION OF THE DRAWINGS

A brief description of each drawing is provided to more sufficiently understand drawings used in the detailed description of the present invention.

DETAILED DESCRIPTION

In the following detailed description, exemplary embodiments of the present invention have been shown and described, simply by way of illustration. As those skilled in the art would realize, the described embodiments may be modified in various different ways, all without departing from the spirit or scope of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, a fastening clip for a vehicle according to an exemplary embodiment of the present invention will be described with reference to FIGS. 1 to 4.

Figure 1:
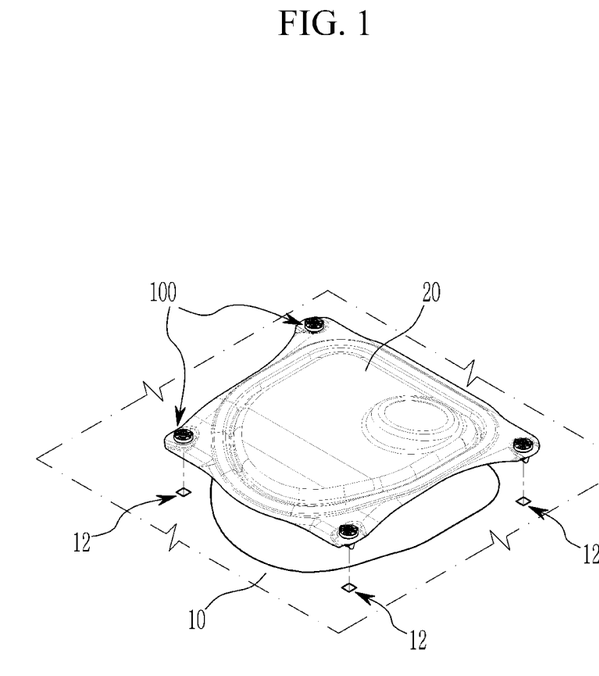
FIG. 1 is a view illustrating a process of fastening a fastening clip for a vehicle according to the exemplary embodiment of the present invention to a vehicle structure and fastening the fastening clip, together with the vehicle structure, to a vehicle body panel.
Figure 2:
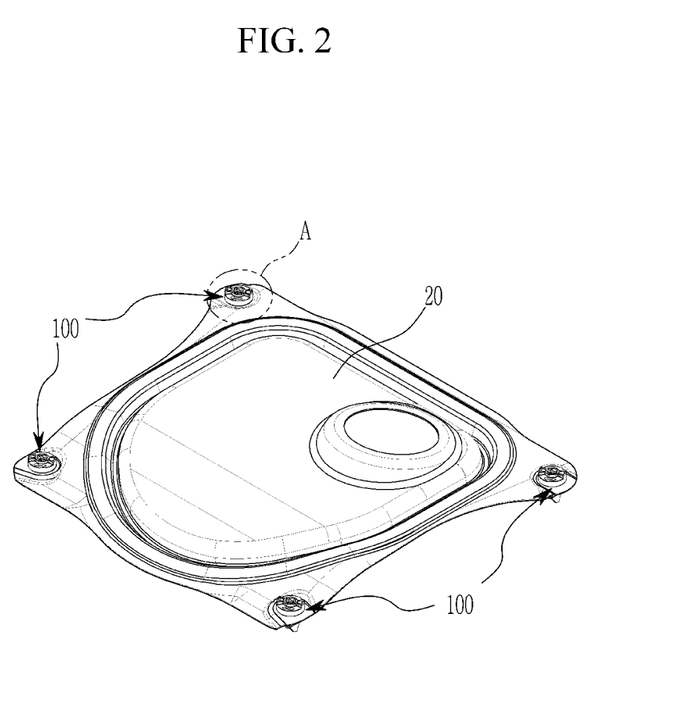
FIG. 2 is a view illustrating when the fastening clip for a vehicle according to the exemplary embodiment of the present invention is fastened to the vehicle structure.
Figure 3:
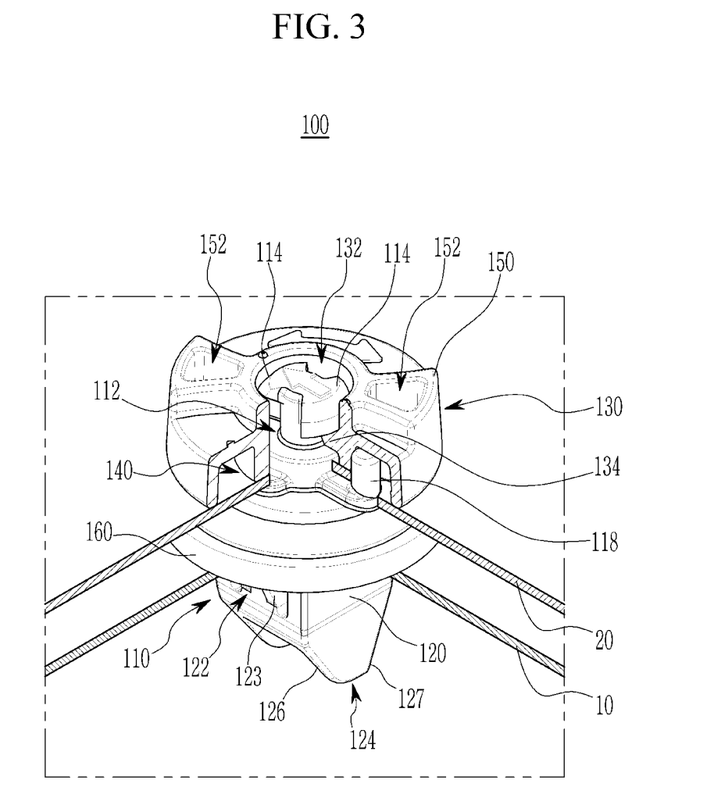
FIG. 3 is a configuration view of the fastening clip for a vehicle in which part "A" in FIG. 2 is enlarged according to the exemplary embodiment of the present invention.
Figure 4:
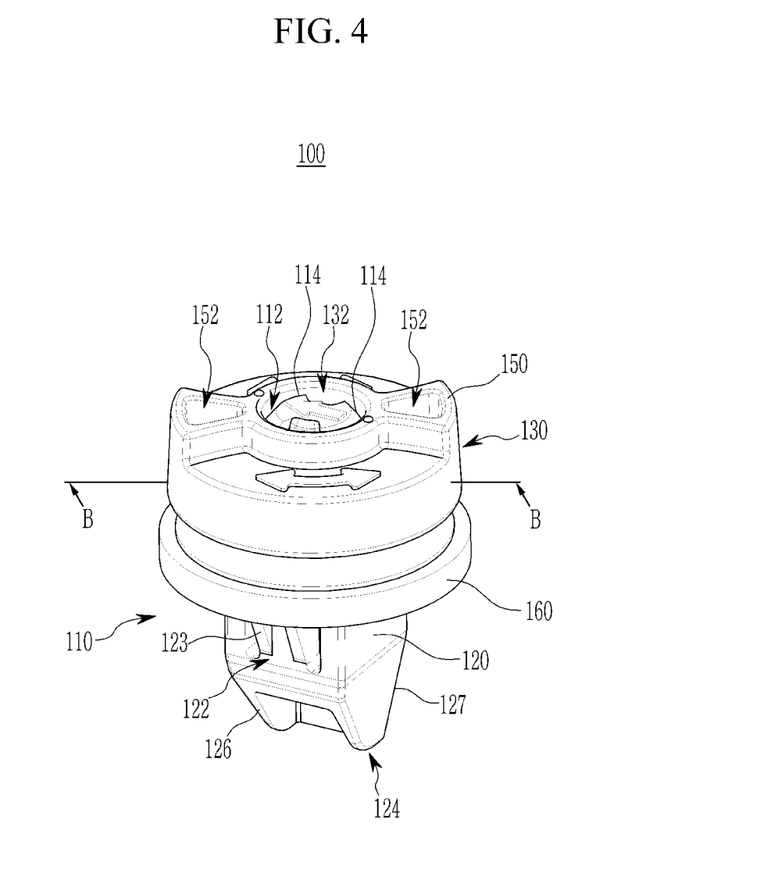
FIG. 4 is a perspective side view schematically illustrating the fastening clip for a vehicle according to the exemplary embodiment of the present invention.

FIG. 1 is a view illustrating a process of fastening a fastening clip for a vehicle according to the exemplary embodiment of the present invention to a vehicle structure and fastening the fastening clip, together with the vehicle structure, to a vehicle body panel, FIG. 2 is a view illustrating when the fastening clip for a vehicle according to the exemplary embodiment of the present invention is fastened to the vehicle structure, and FIG. 3 is a configuration view of the fastening clip for a vehicle in which part "A" in FIG. 2 is enlarged. FIG. 4 is a perspective side view schematically illustrating the fastening clip for a vehicle according to the exemplary embodiment of the present invention.

Referring to FIGS. 1 and 2, a fastening clip 100 for a vehicle may be mounted on a vehicle structure 20, and the fastening clip 100 may be inserted into a vehicle body panel 10. Referring to FIGS. 3 to 4, the fastening clip 100 may include a main body 110, a holder 130, and a packing 160. The main body 110 may include a support portion 111, a holder insertion portion 112, push protrusions 114, fitting protrusions 118, a panel insertion portion 120, hooks 122, an insertion guide 124, a first guide surface 126, and a second guide surface 127. The holder 130 may include an insertion port 132, a support protrusion 134, fitting protrusion grooves 140, handle portions 150, and tool grooves 152. The fastening clip 100 may be coupled to the vehicle structure 20 through the holder 130, and the fastening clip 100 coupled to the vehicle structure 20 may be inserted into the vehicle body panel 10 with the packing 160 disposed between the fastening clip 100 and the vehicle body panel 10. The packing 160 may reduce abrasion during a process of coupling or separating the fastening clip 100 for a vehicle and the vehicle body panel 10, and the packing 160 may provide watertightness (e.g., seal) while the fastening clip 100 for a vehicle and the vehicle body panel 10 are coupled.

Figure 5:
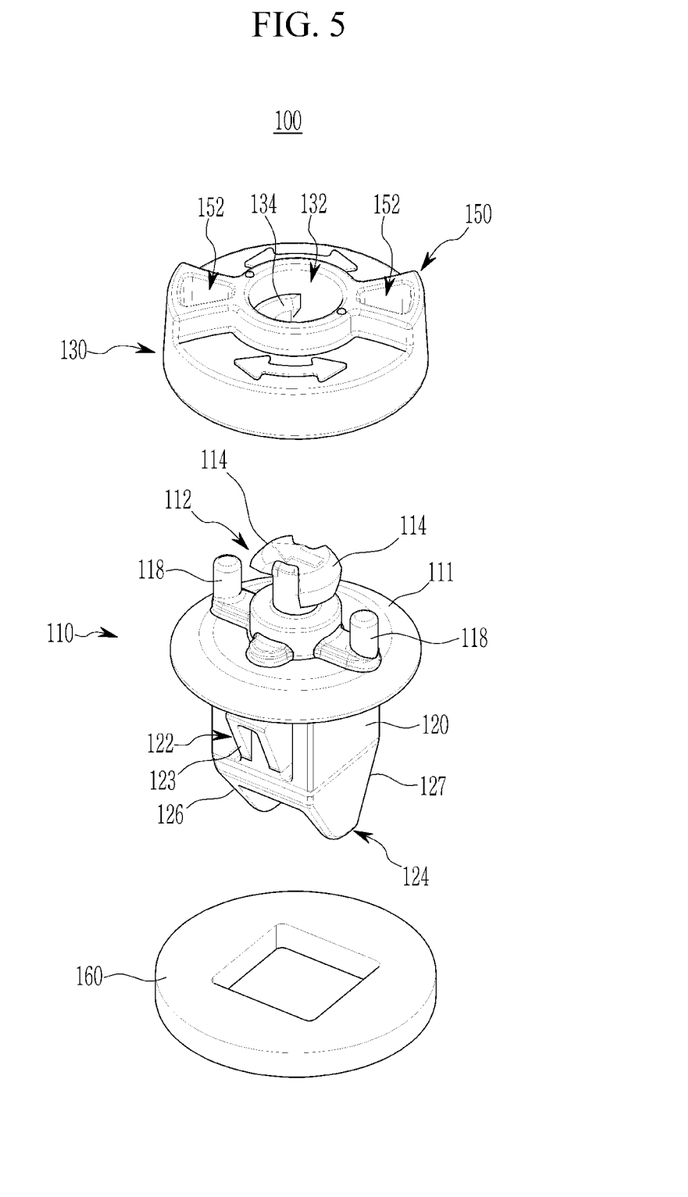
FIG. 5 is a detailed perspective view of the fastening clip for a vehicle according to the exemplary embodiment of the present invention.

FIG. 5 is a detailed perspective view of the fastening clip for a vehicle according to the exemplary embodiment of the present invention. Referring to FIG. 5, the support portion 111 may be formed integrally with the main body 110, the holder insertion portion 112 may be formed at an upper side of the support portion 111, and the panel insertion portion 120 may be formed at a lower side of the support portion 111. The holder insertion portion 112 may include at least one push protrusion 114 which protrudes from a center toward an upper side, and at least one fitting protrusion 118 which is spaced apart from the push protrusion 114 radially outward and protrudes toward an upper side.

The holder 130 may include the insertion port 132 into which the push protrusion 114 may be inserted, and the insertion port 132 may include at least one support protrusion 134. The handle portion 150 may be formed at an upper side of the holder 130, and the tool groove 152 may be formed in the handle portion 150. The panel insertion portion 120 may include the hook 122 which is spaced apart from the support portion 111 toward the lower side and protrudes radially outward. The insertion guide 124, which has a diameter that decreases from an upper end toward a lower end, may be formed at a lower end of the panel insertion portion 120, and the insertion guide 124 may include at least a first guide surface 126 and a second guide surface 127 opposite to the first guide surface 126.

Figure 6:
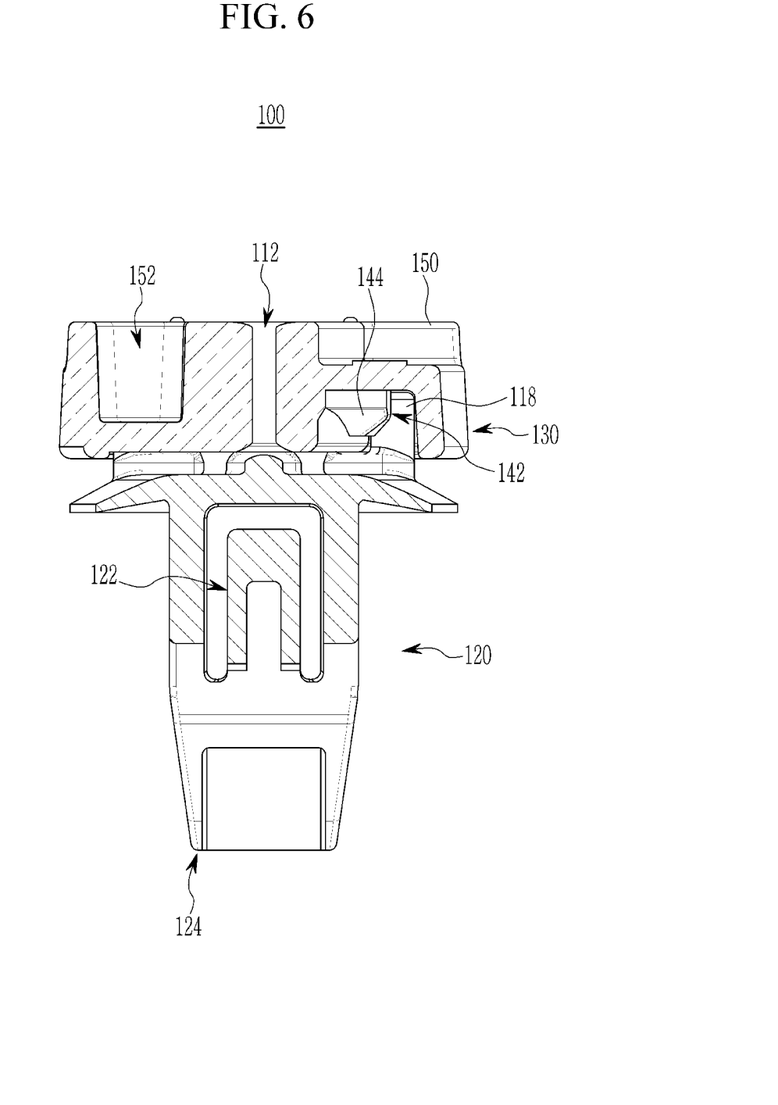
FIG. 6 is a cross-sectional view of the fastening clip for a vehicle taken along line 'B-B' in FIG. 4 according to the exemplary embodiment of the present invention.
Figure 7:
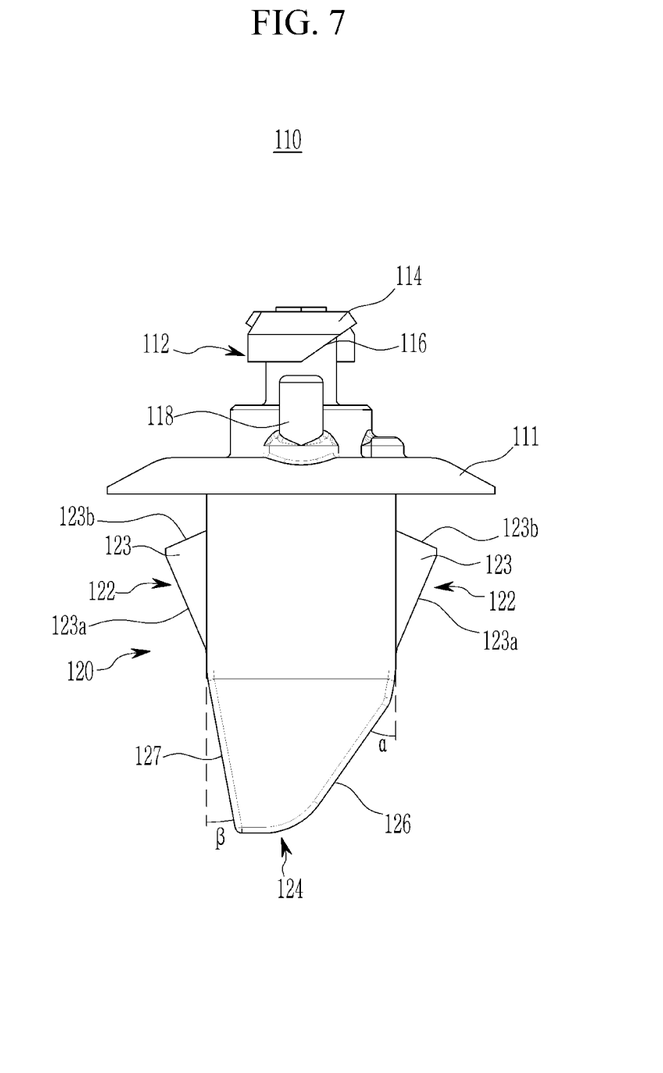
FIG. 7 is a side view illustrating a main body of the fastening clip for a vehicle according to the exemplary embodiment of the present invention.
Figure 8:
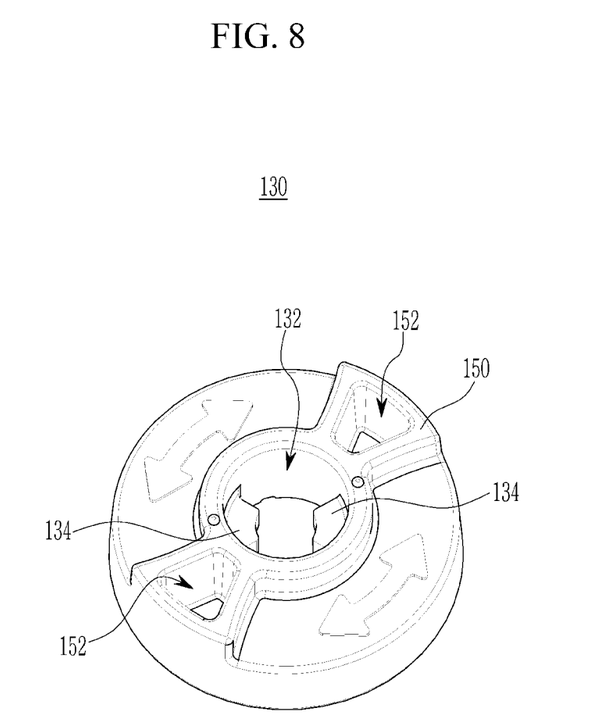
FIG. 8 is a perspective view illustrating one side of a holder of the fastening clip for a vehicle according to the exemplary embodiment of the present invention.
Figure 9:
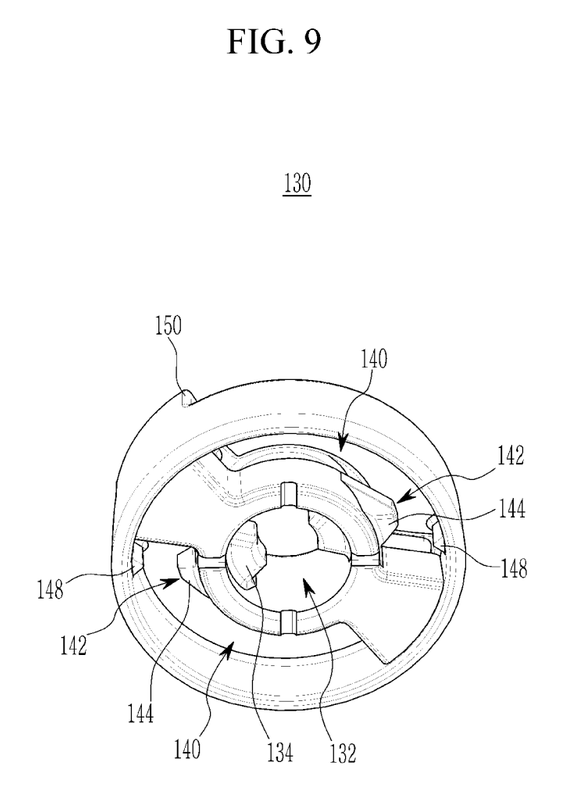
FIG. 9 is a perspective view illustrating the other side of the holder of the fastening clip for a vehicle according to the exemplary embodiment of the present invention.

Hereinafter, the fastening clip for a vehicle according to the exemplary embodiment of the present invention will be described with reference to FIGS. 6 to 9. FIG. 6 is a cross-sectional view of the fastening clip for a vehicle taken along line 'B-B' in FIG. 4, FIG. 7 is a side view illustrating the main body 110 of the fastening clip for a vehicle according to the exemplary embodiment of the present invention, FIG. 8 is a perspective view illustrating an upper side of a holder of the fastening clip for a vehicle according to the exemplary embodiment of the present invention, and FIG. 9 is a perspective view illustrating a lower side of the holder of the fastening clip for a vehicle according to the exemplary embodiment of the present invention.

Referring to FIGS. 6 to 9, each of the fitting protrusion grooves 140 may include a fixing protrusion 142 and an obstructing protrusion 148 and may have a structure in which the fitting protrusion 118 may engage with the fixing protrusion 142 when the holder 130 rotates relative to the holder insertion portion 112. The fixing protrusion 142 may include a fitting protrusion approaching surface 144, and the fitting protrusion 118 may be slidably coupled to the fixing protrusion 142 along the fitting protrusion approaching surface 144 by the rotation of the holder 130.

A compressing inclined surface 116 may be formed at a lower side of the push protrusion 114, and the support protrusion 134 may be slidably coupled to the push protrusion 114 along the compressing inclined surface 116 by the rotation of the holder 130. The push protrusion 114 may push the support protrusion 134 more strongly to the extent of a height of the compressing inclined surface 116 to increase a coupling force and watertightness between the main body 110 and the holder 130.

The hook 122 may include a fixed end fixed to the panel insertion portion 120, and a free end opposite to the fixed end. A convex portion 123, which protrudes radially outward, may be formed between the fixed end and the free end. A first inclined surface 123a and a second inclined surface 123b may be formed between the convex portion 123 and the fixed end and between the convex portion 123 and the free end, respectively.

Figure 10:
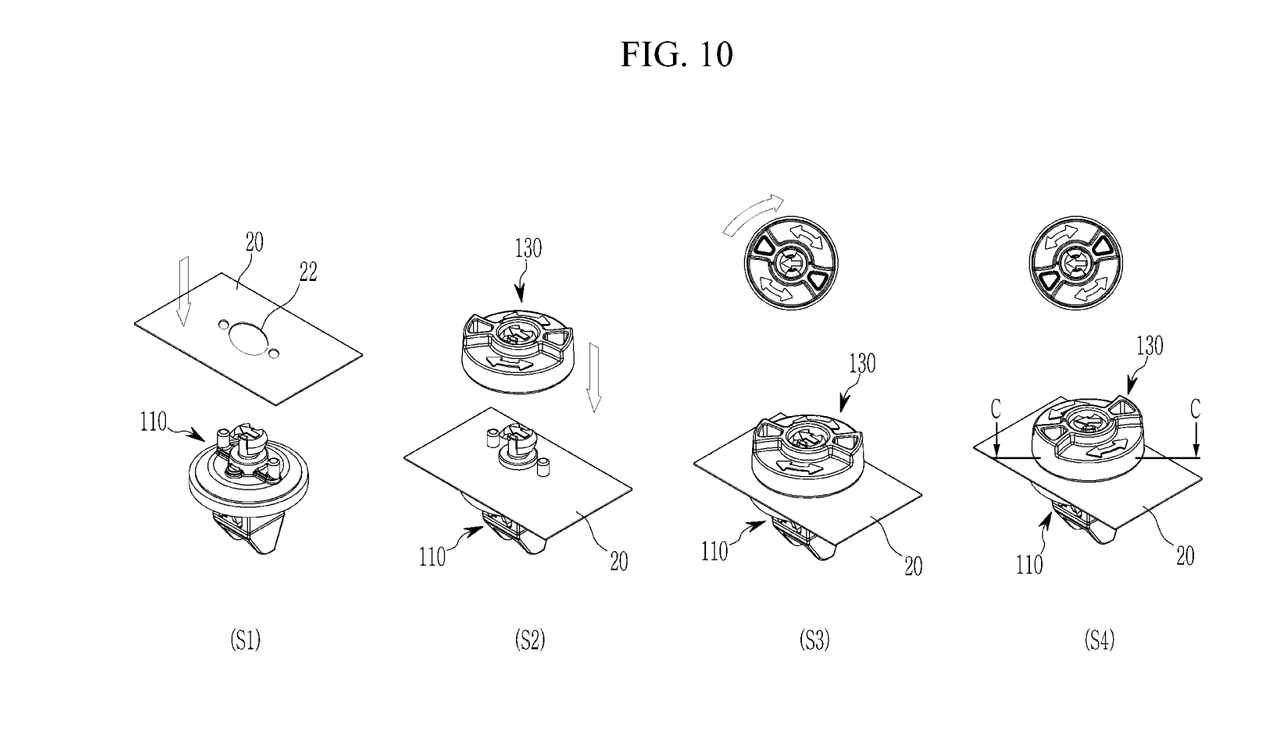
FIG. 10 is a flowchart illustrating a process of fastening the fastening clip for a vehicle according to the exemplary embodiment of the present invention to the vehicle structure.

FIG. 10 is a flowchart illustrating a process of fastening the fastening clip for a vehicle according to the exemplary embodiment of the present invention to the vehicle structure. Referring to step S1 in FIG. 10, the holder insertion portion 112 of the main body 110 may be inserted into at least one first aperture 22 formed in the vehicle structure 20. Referring to step S2 in FIG. 10, the holder insertion portion 112 inserted into the first aperture 22 may be inserted into the holder 130. Further, referring to step S3 in FIG. 10, the holder 130 may be rotated (e.g., by a user) while the holder insertion portion 112 is inserted into the holder 130. In particular, the user may rotate the holder 130 manually, by grasping the handle portion 150 that protrudes toward the upper side of the holder 130, or the user may rotate the holder 130 after inserting a tool into the tool groove 152 formed in the handle portion 150. Subsequently, referring to S4 in FIG. 10, when the holder 130 is completely rotated, the fastening clip 100 for a vehicle may be coupled to the vehicle structure 20.

In the related art, the vehicle structure 20 is assembled to an aperture mainly by bolting, a screw grommet or the like. However, in the aforementioned method of mounting the vehicle structure 20 in the related art, an operator is required to manually mount the vehicle structure 20 using a tool, and accordingly, working time and the number of processes are increased and maintenance characteristics are deteriorated. In the present invention, the user may fasten the vehicle structure 20 more easily to the vehicle body panel 10 in a one-touch manner without a separate tool, to allow working time and the number of processes to be decreased and maintenance characteristics to be improved.

Figure 11:
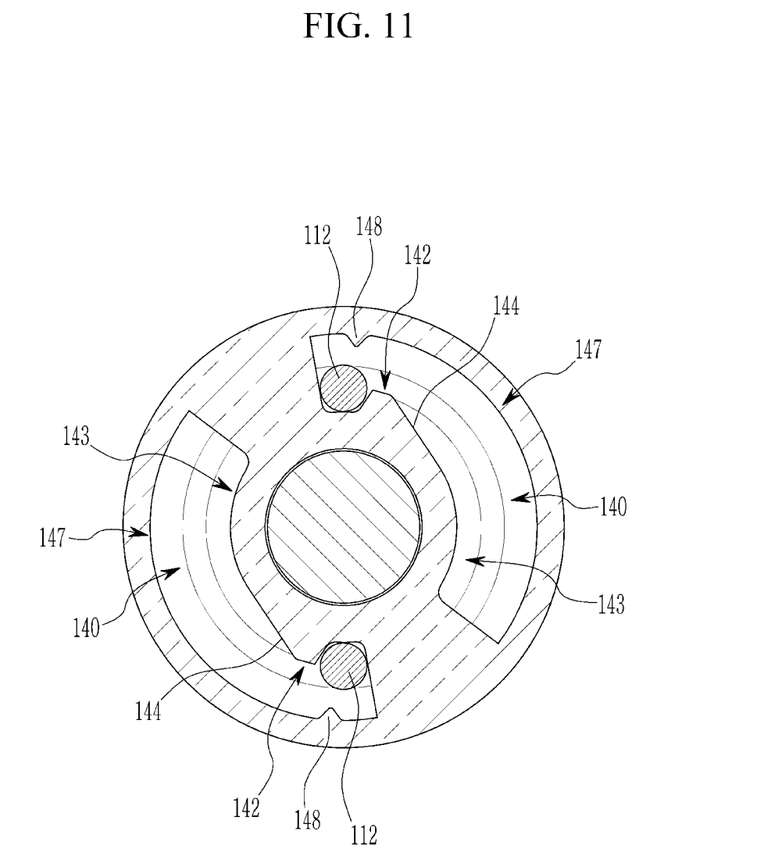
FIG. 11 is a cross-sectional view of the fastening clip for a vehicle taken along line 'C-C' in FIG. 10 according to the exemplary embodiment of the present invention.

FIG. 11 is a cross-sectional view of the fastening clip for a vehicle taken along line 'C-C' in FIG. 10. Referring to FIG. 11, the fitting protrusion groove 140 may include an inner circumferential surface 143 which has an arc shape, and an outer circumferential surface 147 which is formed at a predetermined interval from the inner circumferential surface and has an arc shape. The fitting protrusion 118 may be movable along the inner circumferential surface while the fitting protrusion 118 is inserted into the fitting protrusion groove 140. The fixing protrusion 142, which engages with the fitting protrusion 118, may protrude radially outward from one end of the inner circumferential surface.

The obstructing protrusion 148, which protrudes radially inward, may be formed on the outer circumferential surface of the fitting protrusion groove 140 at a position that corresponds to the fixing protrusion 142. When the fitting protrusion 118 is withdrawn from the fixing protrusion 142 due to an unexpected impact while the fitting protrusion 118 is engaged with the fixing protrusion 142, the obstructing protrusion 148 may guide the fitting protrusion 118 to an original position, thereby allowing the fitting protrusion 118 to engage with the fixing protrusion 142 again to maintain the holder 130 and the main body 110 to be coupled.

Figure 12:
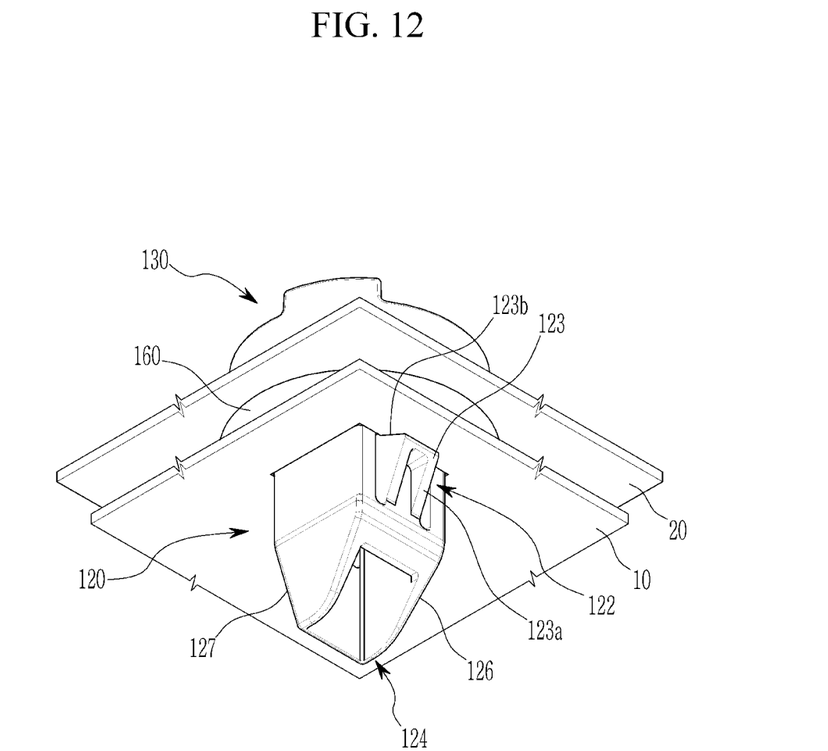
FIG. 12 is a perspective view illustrating when the vehicle structure is fastened to the vehicle body panel by the fastening clip for a vehicle according to the exemplary embodiment of the present invention.

FIG. 12 is a perspective view illustrating when the vehicle structure is fastened to the vehicle body panel by the fastening clip for a vehicle according to the exemplary embodiment of the present invention. Referring to FIG. 12, the hook 122 of the panel insertion portion 120 may include the fixed end fixed to the panel insertion portion 120. The free end opposite to the fixed end, and the free end may be rotatable about the fixed end. The hook 122 may further include the convex portion 123 which protrudes radially outward between the fixed end and the free end, and the first inclined surface 123a and the second inclined surface 123b may be formed between the convex portion 123 and the fixed end and between the convex portion 123 and the free end, respectively. The convex portion 123 may be moved radially inward when inserting the panel insertion portion 120 into a second aperture 12 formed in the vehicle body panel 10. When the fastening clip 100 is mounted, the convex portion 123 may be resiliently restored to an initial position and may support the vehicle body panel 10, thereby maintaining the coupled state between the fastening clip 100 for a vehicle and the vehicle body panel 10.

Figure 13:
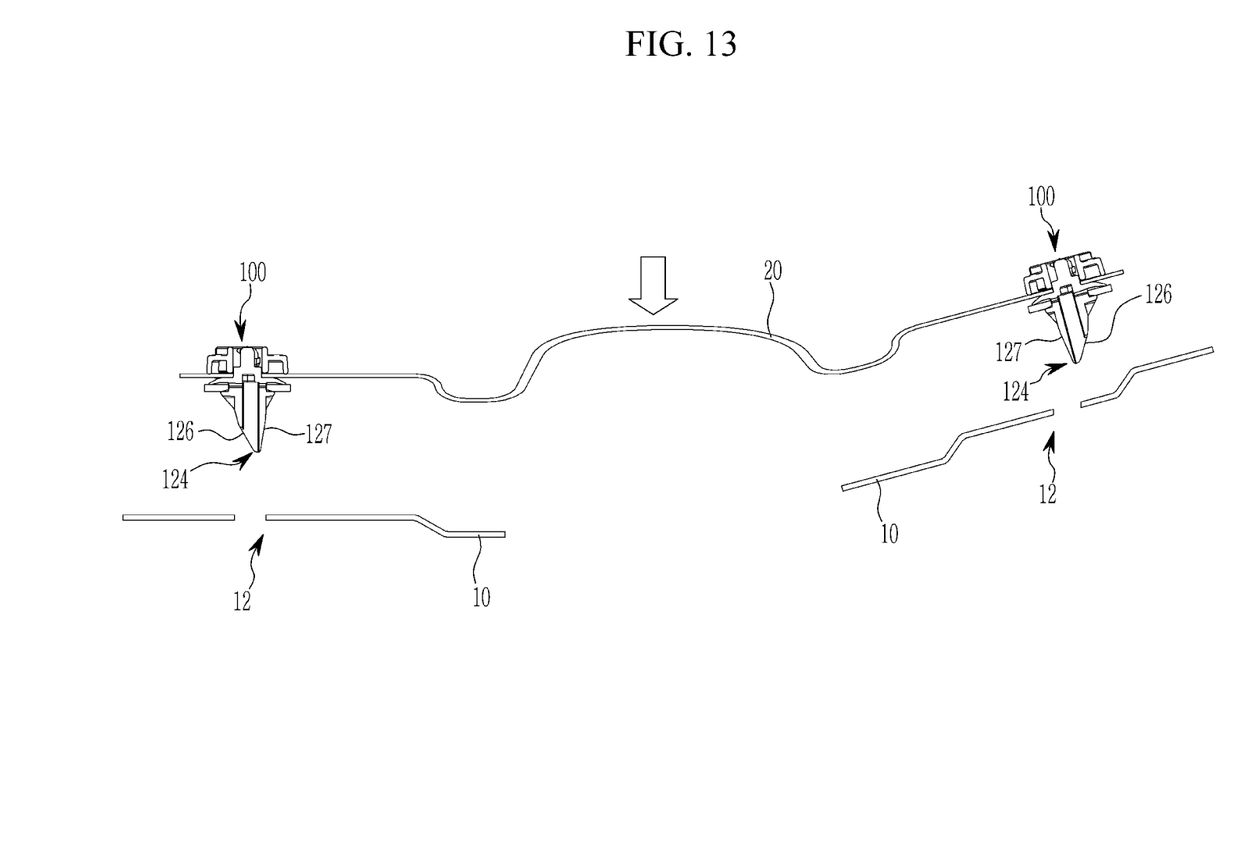
FIG. 13 is a view schematically illustrating when the fastening clip for a vehicle according to the exemplary embodiment of the present invention, the vehicle body panel, and the vehicle structure are fastened.

FIG. 13 is a view schematically illustrating when the fastening clip for a vehicle according to the exemplary embodiment of the present invention, the vehicle body panel, and the vehicle structure are fastened. Referring to FIG. 13, the insertion guide 124, which has a diameter that decreases from an upper end toward a lower end, may be formed at the lower end of the panel insertion portion 120, the insertion guide 124 may at least include the first guide surface 126 and the second guide surface 127 opposite to the first guide surface 126, and an angle α of the first guide surface 126 may be greater than an angle β of the second guide surface 127.

When the vehicle structure 20 has a planar shape, the multiple fastening clips 100 coupled to the vehicle structure 20 may be more easily and simultaneously inserted into the vehicle body panel 10. However, when the vehicle structure 20 does not have a planar shape and the multiple fastening clips 100 coupled to the vehicle structure 20 are inserted into the vehicle body panel 10 at different angles, the multiple fastening clips 100 may be more easily and simultaneously inserted into the vehicle body panel 10 due a difference in the angles between the first guide surface 126 and the second guide surface 127.

Figure 14:
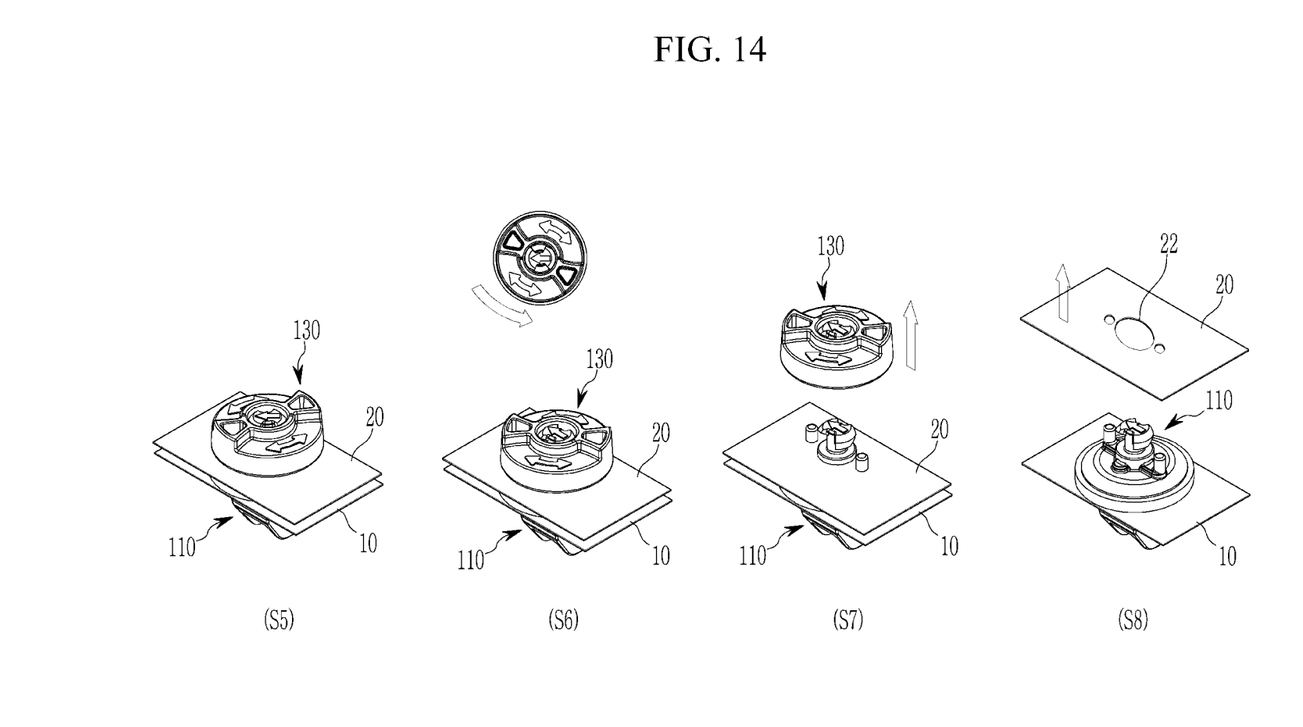
FIG. 14 is a flowchart illustrating a process of separating the vehicle structure when the fastening clip for a vehicle according to the exemplary embodiment of the present invention, the vehicle body panel, and the vehicle structure are fastened.

FIG. 14 is a view illustrating a process of separating the vehicle structure when the fastening clip for a vehicle according to the exemplary embodiment of the present invention, the vehicle body panel, and the vehicle structure are fastened. Referring to step S5 in FIG. 14, the fastening clip 100 may be coupled to the vehicle structure 20 by the holder 130. Referring to step S6 in FIG. 14, the user may rotate the holder 130 to unfasten the holder 130 and the fastening clip 100 for a vehicle. Referring to step S7 in FIG. 14, the holder 130 may be separated from the fastening clip 100 for a vehicle. In particular, the user may rotate the holder 130 manually, by grasping the handle portion 150 that protrudes toward the upper side of the holder 130, or the user may rotate the holder 130 after inserting a tool into the tool groove 152 formed in the handle portion 150. Referring to step S8 in FIG. 14, the vehicle structure 20 may be separated from the fastening clip 100 for a vehicle.

In the related art, the vehicle structure 20 is assembled to an aperture mainly by bolting, a screw grommet, or the like. However, in the aforementioned method of mounting the vehicle structure 20 in the related art, an operator is required to manually separate the vehicle structure 20 from a vehicle body using a tool to maintain the vehicle structure 20 and components, and accordingly, working time and the number of processes are increased and maintenance characteristics are deteriorated. In the present invention, the user may separate the vehicle structure 20 more easily from the vehicle body panel 10 in a one-touch manner without a separate tool, to decrease working time and the number of processes and improve maintenance properties and reusability of parts.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

10: Vehicle body panel
12: Second aperture
20: Vehicle structure
22: First aperture
100: Fastening clip for vehicle
110: Main body
111: Support portion
112: Holder insertion portion
114: Push protrusion
116: Compressing inclined surface
118: Fitting protrusion
120: Panel insertion portion
122: Hook
123: Convex portion
124: Insertion guide
126: First guide surface
127: Second guide surface
130: Holder
132: Insertion port
134: Support protrusion
140: Fitting protrusion groove
142: Fixing protrusion
144: Fitting protrusion approaching surface
148: Obstructing protrusion
150: Handle portion
152: Tool groove
160: Packing

What is claimed is:

1. A fastening clip for a vehicle, comprising:
a main body formed integrally with a support portion disposed between a vehicle structure and a vehicle body panel of the vehicle, wherein an upper end of the main body is inserted into at least one first aperture formed in the vehicle structure, and a lower end of the main body is inserted into at least one second aperture formed in the vehicle body panel; and
a holder detachably coupled to the main body and fixing the vehicle structure to the main body,
wherein the main body includes:
a holder insertion portion formed at an upper side of the support portion and inserted into the holder; and
a panel insertion portion formed at a lower side of the support portion and inserted into the second aperture, and
wherein the holder insertion portion includes at least one push protrusion that protrudes at a center toward the upper side, the holder includes an insertion portion into which the push protrusion is inserted, the insertion port includes at least one support protrusion, and the push protrusion and the support protrusion are slidably coupled by a rotation of the holder.

2. The fastening clip of claim 1, wherein an approaching inclined surface is formed at a lower side of the push protrusion.

3. The fastening clip of claim 1, wherein the holder insertion portion further includes at least one fitting protrusion spaced apart from the push protrusion radially outward and protrudes toward the upper side, the holder further includes a fitting protrusion groove into which the fitting protrusion is inserted, and the holder is rotatable relative to the holder insertion portion while the fitting protrusion is inserted into the fitting protrusion groove.

4. The fastening clip of claim 3, wherein the fitting protrusion groove includes:
an inner circumferential surface having an arc shape; and
an outer circumferential surface formed at a predetermined interval from the inner circumferential surface and having an arc shape, wherein the fitting protrusion is movable along the inner circumferential surface, a fixing protrusion, which engages with the fitting protrusion, protrudes radially outward from one end of the inner circumferential surface, and wherein the fixing protrusion includes a fitting protrusion approaching surface.

5. The fastening clip of claim 4, wherein an obstructing protrusion, which protrudes radially inward, is formed on the outer circumferential surface of the fitting protrusion groove at a position that corresponds to the fixing protrusion.

6. The fastening clip of claim 1, wherein a handle portion is formed at an upper side of the holder to be rotatable together.

7. The fastening clip of claim 6, wherein a tool groove is formed in the handle portion.

8. The fastening clip of claim 1, wherein the panel insertion portion further includes a hook spaced apart from the support portion toward the lower side and that protrudes radially outward.

9. The fastening clip of claim 8, wherein the hook includes:
a fixed end fixed to the panel insertion portion; and
a free end opposite to the fixed end,
wherein the free end is rotatable about the fixed end.

10. The fastening clip of claim 9, wherein the hook further includes:
a convex portion which protrudes radially outward between the fixed end and the free end;
a first inclined surface formed between the convex portion and the fixed end; and
a second inclined surface formed between the convex portion and the free end.

11. The fastening clip of claim 10, wherein the convex portion is moved radially inward when mounting the fastening clip for a vehicle on the vehicle body panel, and the convex portion is resiliently restored to an initial position when the fastening clip for a vehicle is mounted.

12. The fastening clip of claim 8, wherein an insertion guide, which has a diameter that decreases from an upper end toward a lower end, is formed at the lower end of the panel insertion portion, the insertion guide includes a first guide surface, and a second guide surface opposite to the first guide surface.

13. The fastening clip of claim 1, further comprising:
a packing which seals a portion between the vehicle body panel and the main body.

14. The fastening clip of claim 13, wherein the panel insertion portion further includes:
a hook spaced apart from the support portion toward the lower side and protrudes radially outward,
wherein the packing is disposed between the support portion and the hook.

15. A method of mounting a vehicle structure to a vehicle body panel using the fastening clip for a vehicle according to claim 1, in which the main body includes a holder insertion portion which is formed at an upper side of the support portion and inserted into a holder, and a panel insertion portion which is formed at a lower side of the support portion and inserted into the vehicle body panel, comprising:
supporting the vehicle structure on the support portion by inserting the holder insertion portion into the second aperture;
coupling the holder and the holder insertion portion;
rotating the holder relative to the holder insertion portion; and
inserting the panel insertion portion of the fastening clip for a vehicle, on which the vehicle structure is mounted, into the vehicle body panel,
wherein the panel insertion portion further includes a hook which is elastically rotatable about the panel insertion portion, the hook is moved radially inward when inserting the panel insertion portion into the vehicle body panel, and the hook returns to an original position when the fastening clip is mounted.

* * * * *